Figure 1A:
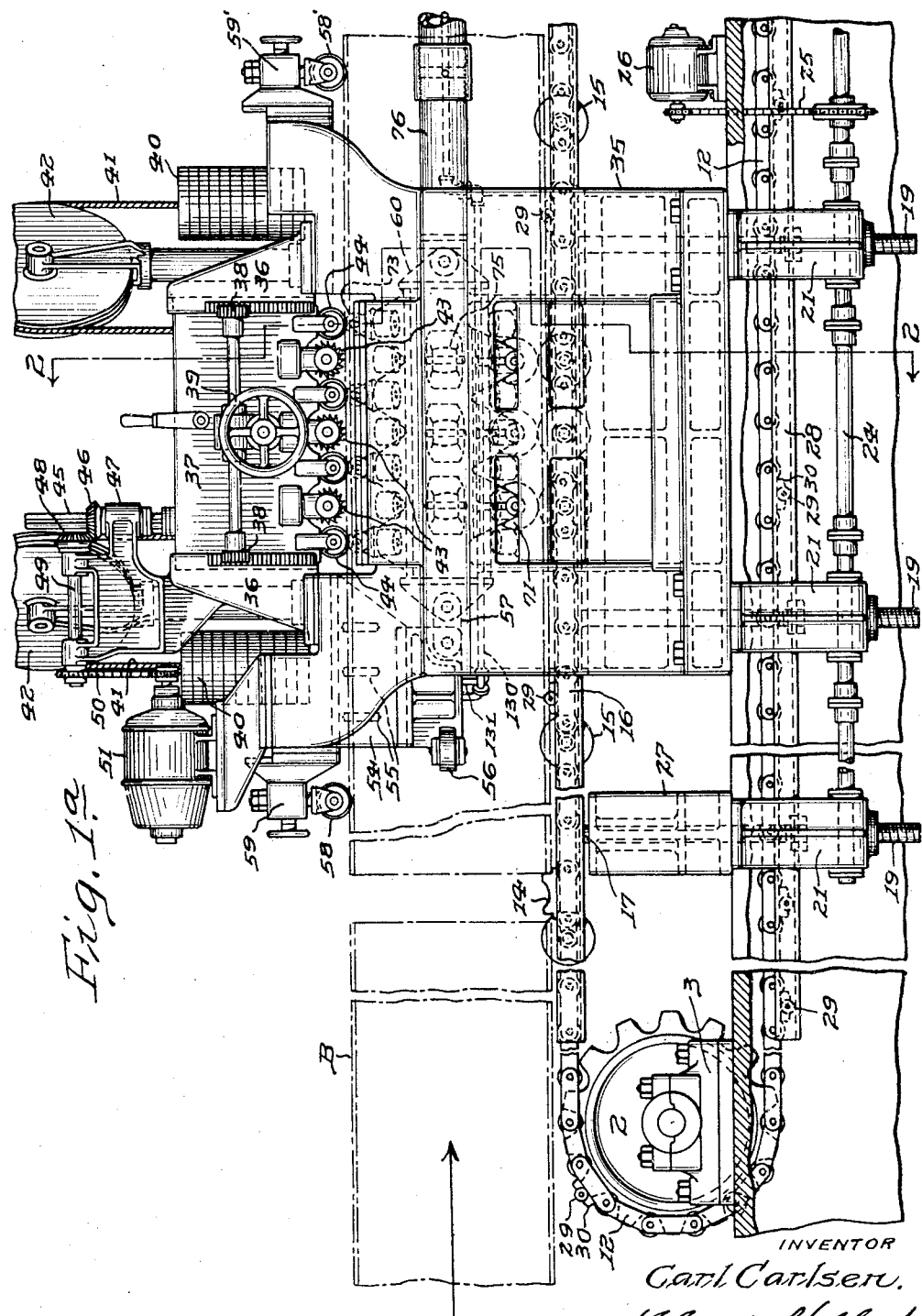

Dec. 11, 1934.   C. CARLSEN   1,983,930
METHOD OF AND APPARATUS FOR WELDING TUBULAR ARTICLES
Filed April 30, 1930   8 Sheets-Sheet 1

WITNESS
F. J. Hartman.

INVENTOR
Carl Carlsen.
BY
ATTORNEYS

Dec. 11, 1934.                 C. CARLSEN                  1,983,930
         METHOD OF AND APPARATUS FOR WELDING TUBULAR ARTICLES
                  Filed April 30, 1930      8 Sheets-Sheet 2

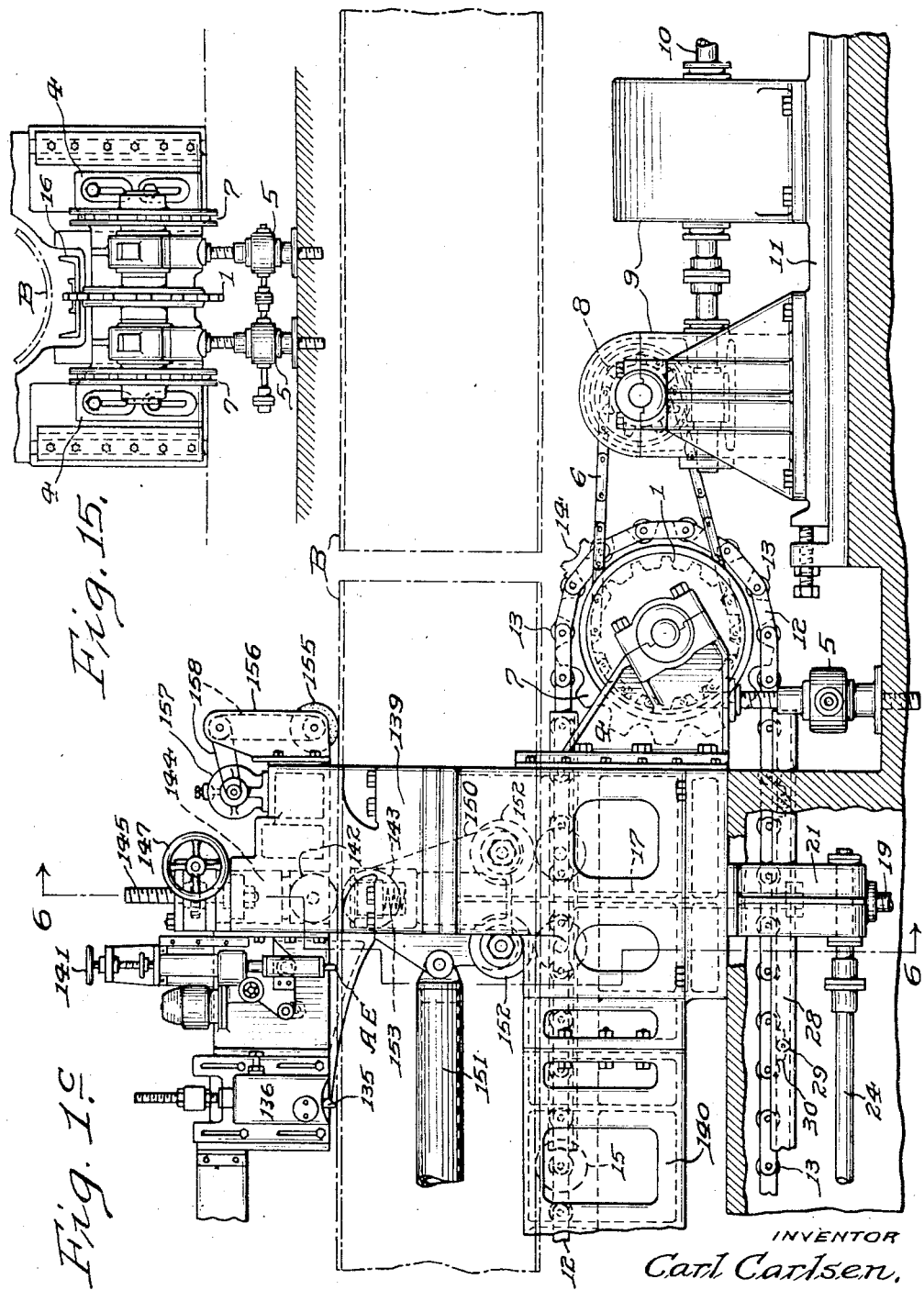

Dec. 11, 1934.                C. CARLSEN                1,983,930
           METHOD OF AND APPARATUS FOR WELDING TUBULAR ARTICLES
                    Filed April 30, 1930      8 Sheets-Sheet 4
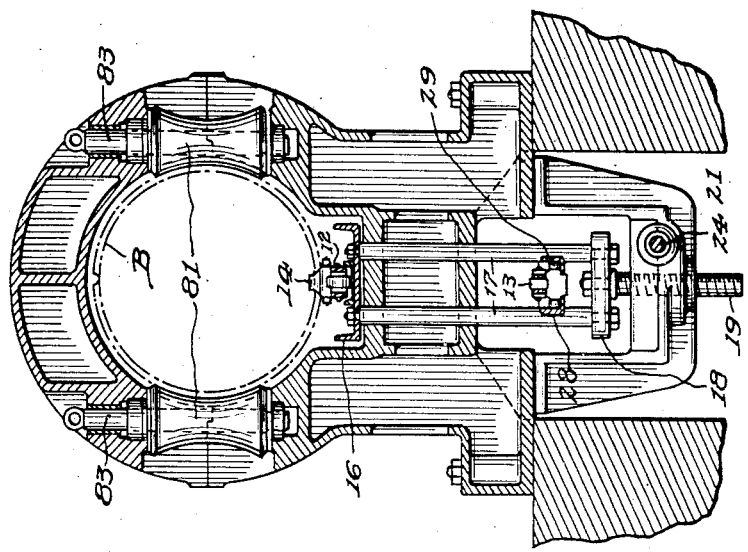
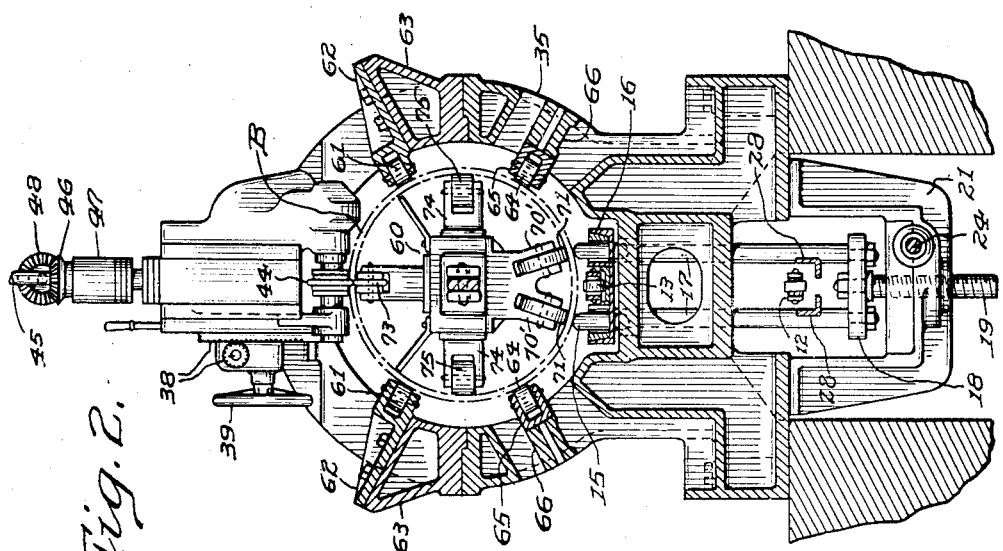
INVENTOR
Carl Carlsen.

Dec. 11, 1934.   C. CARLSEN   1,983,930
METHOD OF AND APPARATUS FOR WELDING TUBULAR ARTICLES
Filed April 30, 1930   8 Sheets-Sheet 5
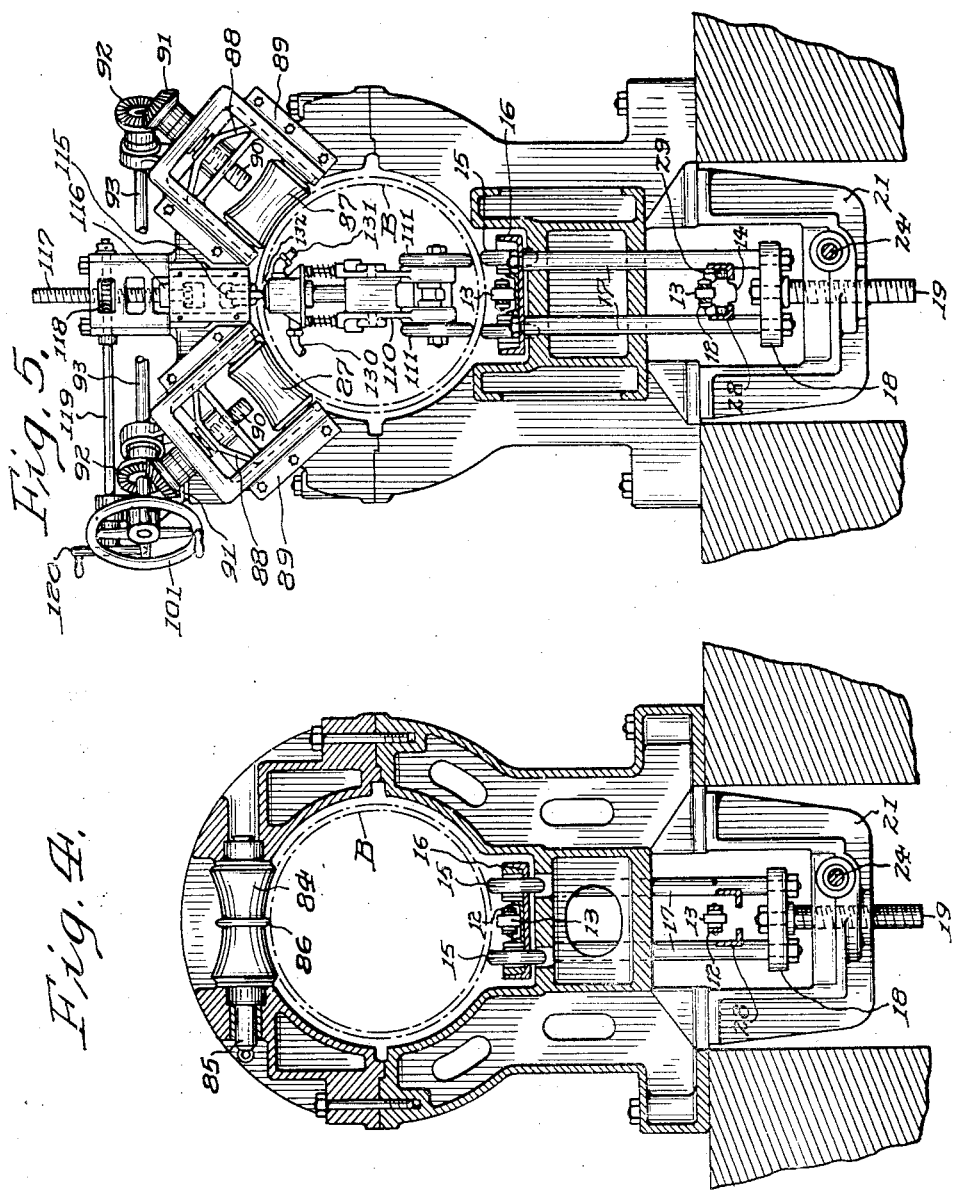
INVENTOR
Carl Carlsen.
BY
ATTORNEYS
WITNESS Dec. 11, 1934.　　　C. CARLSEN　　　1,983,930
METHOD OF AND APPARATUS FOR WELDING TUBULAR ARTICLES
Filed April 30, 1930　　8 Sheets-Sheet 6
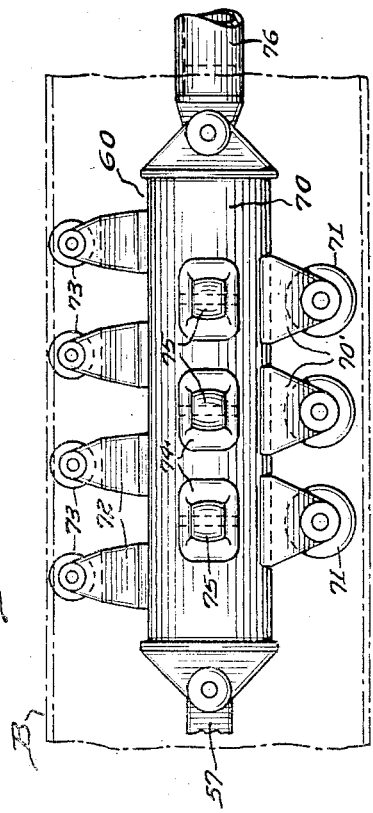
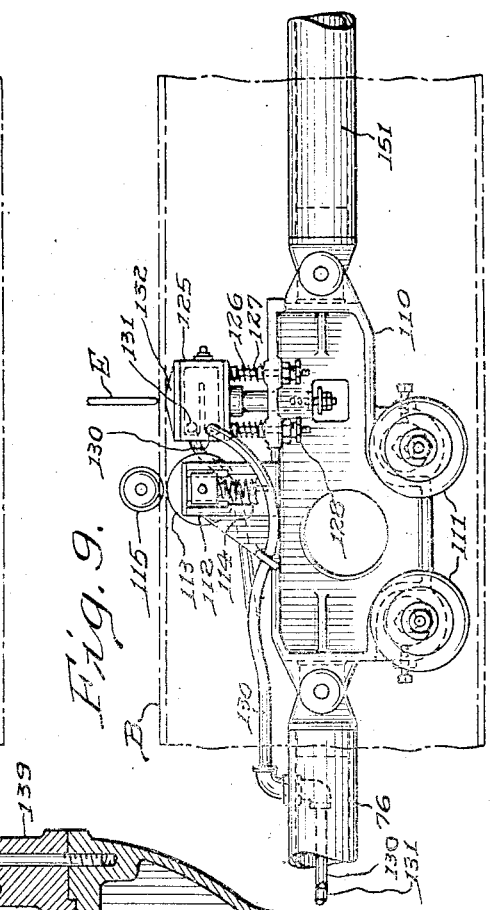
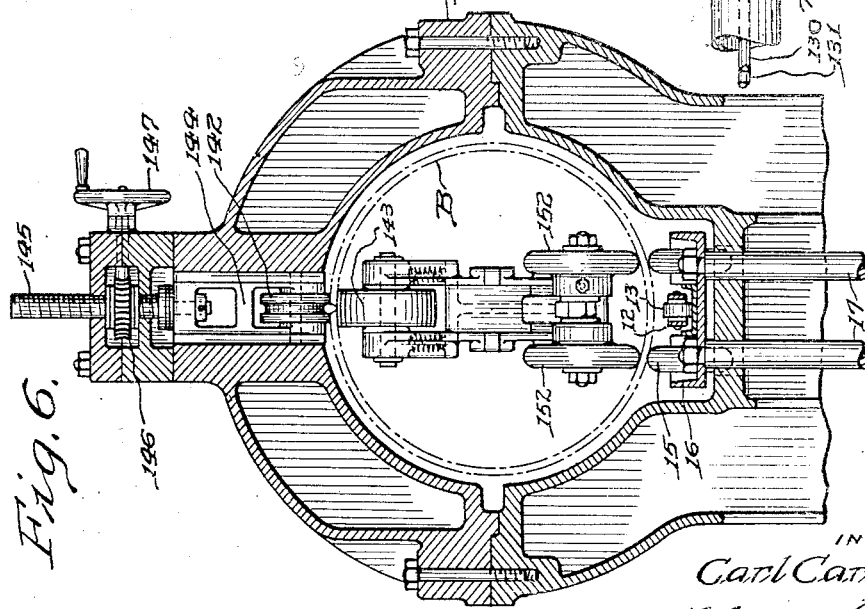
INVENTOR
Carl Carlsen.
BY Blount & Hilbert
ATTORNEYS
WITNESS
F. J. Hartman.

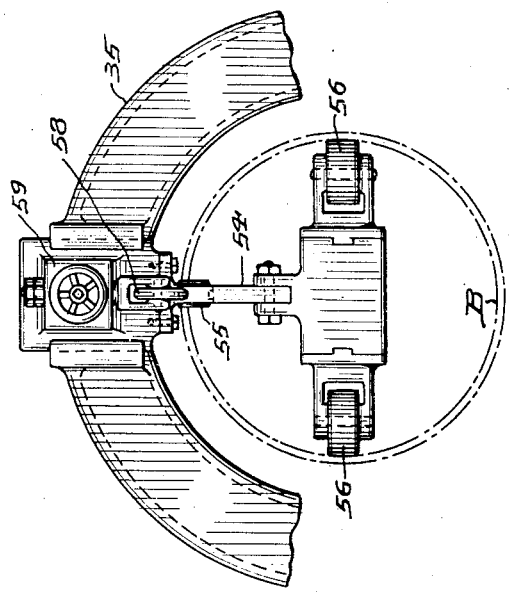
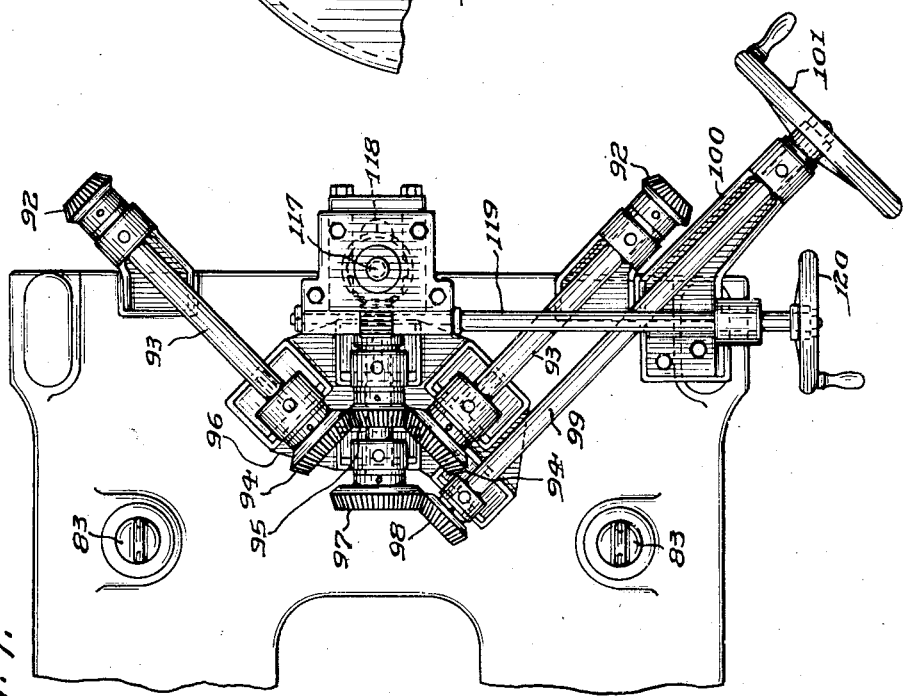

Dec. 11, 1934. C. CARLSEN 1,983,930
METHOD OF AND APPARATUS FOR WELDING TUBULAR ARTICLES
Filed April 30, 1930 8 Sheets-Sheet 8
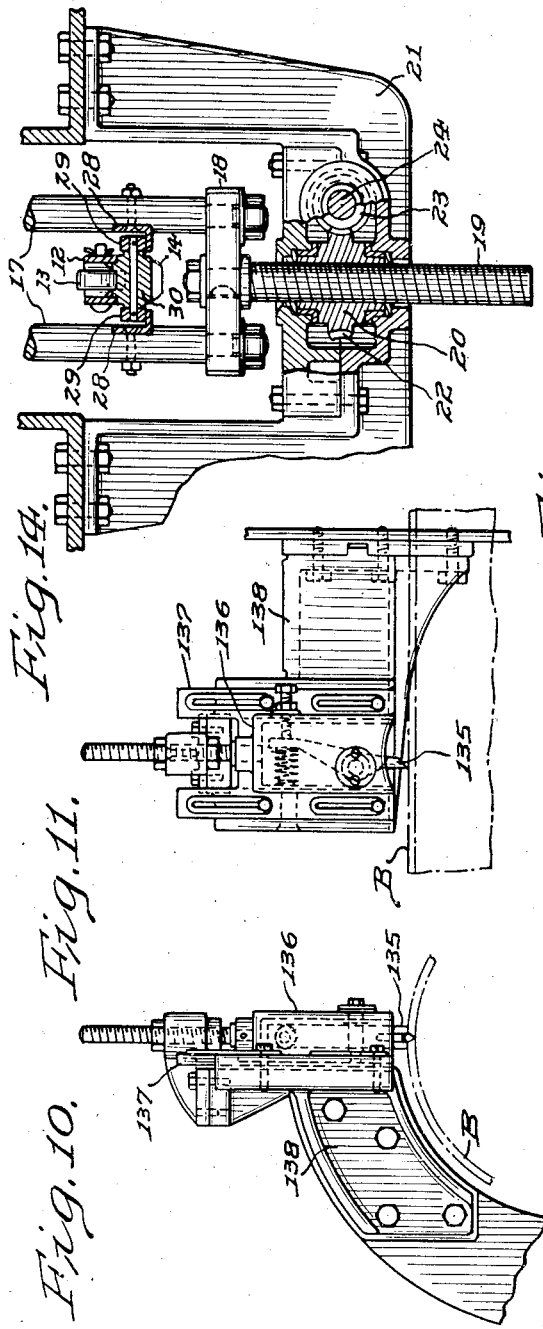
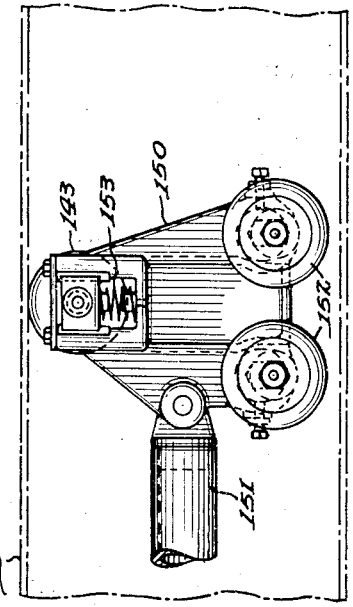
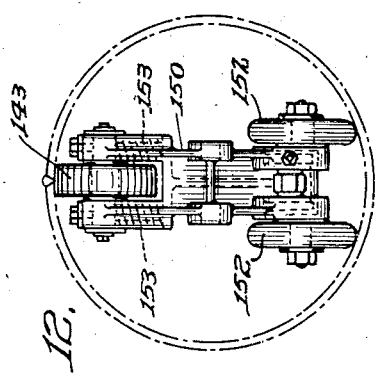
INVENTOR
Carl Carlsen.
BY
ATTORNEYS
WITNESS
F.J. Hartman.

Patented Dec. 11, 1934

1,983,930

UNITED STATES PATENT OFFICE 1,983,930

METHOD OF AND APPARATUS FOR WELDING TUBULAR ARTICLES

Carl Carlsen, Youngstown, Ohio

Application April 30, 1930, Serial No. 448,455

6 Claims. (Cl. 219—6)

The present invention relates to the welding of the longitudinal seam produced when a flat blank is formed up into a tube, as in the manufacture of pipe and other similar articles, a principal object of the invention being to provide a novel method of performing the welding operation as well as a novel form of apparatus suitable for the performance of that method, said apparatus comprising various correlated and coordinated instrumentalities which are effective to move and to progressively perform upon the blank various steps and operations which, collectively, result in the production of a strong, ductile and otherwise satisfactory weld.

Among the other objects included in my invention is the provision of an apparatus of the character of that to which reference has just been made and which, among other things, includes means for effecting the requisite longitudinal movement of the blank, means for properly positioning the blank in the apparatus as it is initially moved thereinto and for thereafter maintaining it in proper position therein until it finally leaves the apparatus after the welding operation has been completed, means for preparing the seam for the welding operation and which are effective to remove irregularities in the juxtaposed edges of the seam in the blank due to variations in the width of the skelp from which it is formed up or to other causes, means for properly closing the prepared seam preparatory to the actual welding operation, means for performing the latter, preferably by means of a suitable metallic arc, means for controlling and regulating the welding arc, means for cleaning the surface of the blank in the vicinity of the welded seam from adhering globules of the welding metal and the like, and, in certain cases, for smoothing the seam itself, means for annealing the seam very shortly after its formation yet without heating the blank itself, save perhaps very close to the seam, to the annealing temperature, means for working the metal of the seam before it appreciably loses its annealing temperature, and finally, in the preferred embodiment of the apparatus, means for grinding the seam into coincidence with the blank, these several means and mechanisms all consecutively contributing in correlated sequence to the production of a welded seam of the desired characteristics and forming a complete, substantially automatic, organized machine or apparatus adapted for the performance of its intended function.

While for accomplishing the foregoing and other operations incident to or requisite for satisfactorily carrying out the objects of the present invention various means or instrumentalities may be employed, I have illustrated in the accompanying drawings and shall now proceed to describe for the purpose of enabling those skilled in the art to practise the invention, one form of machine constructed in accordance therewith and which is well adapted for its intended purposes. It will, however, be understood that it is not my intention or desire to thereby confine or restrict myself to the utilization of any particular means for the performance of any or all of the coordinated and correlated functions of the machine or to any specific details in the design, construction and arrangement of the various elements thereof, as the same are capable of material modification in many particulars from the precise embodiments which I have chosen to illustrate and describe herein without departing from the spirit and scope of the invention.

As hitherto stated, the present invention is particularly adapted for use in the manufacture of pipe, and I shall thus for convenience refer hereinto its employment for that purpose, it being, however, understood that the invention may be utilized with equal facility in the manufacture of other tubular articles where it is requisite to weld the longitudinal seam of a tubular blank. It will be further understood that the blanks may be formed up preparatory to their introduction to the machine in any desired way since the method and/or means utilized therefor form no part of the present invention, it being desirable, however, that the blanks be initially brought as near as possible to the desired cross sectional contour and that the juxtaposed longitudinal edges of the blanks be in abutting or substantially abutting engagement when the blanks are brought to the machine.

In the said drawings, Figs. 1a, 1b and 1c together constitute a side elevation of the machine, Fig. 1a showing the left hand end, Fig. 1b the center portion and Fig. 1c the right hand end thereof; said figures should therefore be read together and in the order indicated. Figs. 2 to 6 inclusive are respectively transverse sections through the machine on the section lines in Figs. 1a, 1b and 1c bearing corresponding numbers and looking in the directions indicated by the arrows adjacent the said lines, certain parts of the machine in these various figures being shown in elevation. Fig. 7 is an enlarged fragmentary top plan view of the crushing roll adjusting mechanism; Fig. 8 is a side elevation of the sizing roll bracket or mandrel and adjacent parts removed from the machine and on a somewhat larger scale than as shown in Fig. 1a; Fig. 9 is a side elevation of the chill bar mandrel and adjacent parts on a similar scale; Fig. 10 is a fragmentary end view of the scraper mechanism and Fig. 11 a side elevation thereof, both also on a larger scale than as shown in Fig. 1b; Fig. 12 is an end view of the compressing roller mandrel and Fig. 13 a side view thereof on the same scale as Figs. 8 and 9; Fig. 14 is an enlarged fragmentary detail view showing a portion of the conveyor adjusting mechanism partially in end elevation and partially in section; Fig. 15 is a fragmentary elevation of the right hand end of the machine showing more particularly the driving sprockets and sprocket adjusting gear, the sprocket chains being removed, and Fig. 16 is a rear end view of the spreading rollers and adjacent parts. Throughout the drawings the same symbols of reference are used to designate the various elements.

It will be of assistance at this point to briefly refer to the general construction and mode of operation of the machine, as by so doing a proper understanding of the constructional details and mode of operation of the various means and instrumentalities embodied therein as hereinafter explained will be more readily obtained. Thus, generally speaking, the machine comprises a longitudinally extending conveyor preferably including an endless chain which passes over a driving sprocket at the right hand end of the machine and an idler or driven sprocket adjacent its left hand end in association with mechanism for driving the former, the conveyor being made vertically adjustable so as to adapt the machine for use with blanks of different diameters. This conveyor chain is operative by means of dogs which it carries to move the blanks consecutively through the machine, while the various operations incident to the preparation of the seam, the actual welding thereof, the removal of the excess welding metal or splatters in the vicinity of the seam, the final annealing and working of the seam and the grinding or dressing off thereof are performed, the blank, following the completion of the last operation, passing from the conveyor preparatory to other operations thereon forming no part of the present invention. The blanks are consecutively introduced at the left hand end of the machine, when viewed as in Figs. 1a, 1b and 1c, with their longitudinal seams uppermost, and as each blank progressively moves forward under the influence of the conveyor chain, it is first brought into contact with a vertically disposed positioning roll which enters the seam and serves to prevent any axial rotation of the blank. The blank next encounters a pair of diametrically disposed rollers which contact the inner wall of the blank substantially at opposite ends of its horizontal diameter and expand it slightly so as to open the seam and thus facilitate the passage of the blank past a depending web or fin which extends vertically from the adjacent housing of the machine and serves, among other things, to support the spreading rollers. In its progressive advance, the blank now passes over other sizing or spreading rollers which contact its inner wall at diametrically opposite points and serve to bring it to and maintain it at the desired finished internal diameter, while other rollers disposed exteriorly of the blank press radially inward on its outer surface in opposition to the spreading rollers, thus securely maintaining that part of the blank which is engaged by the several rollers definitely to the ultimate desired size. As the blank traverses these rollers the seam is acted on by one or more milling cutters, three preferably being employed and arranged to operate in sequence, which serve to prepare it for the welding operation by truing up its sides, removing any irregularities or excess metal and bringing it to the proper form, and as the blank is securely maintained as above pointed out during the milling operation at exactly the proper diameter, the shape of the seam as determined by the configuration of the milling cutters may be controlled and regulated to a nicety and thus made of a character which best lends itself to the succeeding welding operation.

As the blank passes from the milling cutters, it encounters another vertically positioned roll which enters the seam and is operative to prevent any axial rotation during the passage of the blank to the welding station which is located at any suitable distance from the milling station and which, among other things, comprises a housing carrying large rollers, one or more pairs of which are disposed on vertical axes on opposite sides of the blank and tend to close again the seam thereof by the exertion of inward pressure along the horizontal diameter of the blank, these rollers having curved faces generally corresponding to the curvature of the outer surface of the blank. Desirably, the housing is provided with two pairs of these rollers disposed in longitudinally spaced relation, and between them is another generally similar roller rotatable on a horizontal axis and thus bearing on the vertical diameter of the blank, this roller being desirably provided with a fin or bead adapted to enter the seam and thus negative any possible axial rotation at this point. In advance of these several rollers, that is, in the direction in which the blank is moving, is still another pair of rollers conveniently designated as crushing rollers by reason of their action on the blank; these rollers are disposed on opposite sides of the blank seam with their axes angularly disposed to the vertical and horizontal diameters of the blank in such manner that the pair of rollers which operate on the exterior of the blank tend to exert oppositely angular and inward crushing force on the blank which is operative to force the edges of the seam into very close contact just prior to the first welding operation which is performed just beyond the crushing rollers by suitable welding mechanism operating preferably on the well known metallic arc principle, the welding electrode being fed to the seam by suitable and preferably automatic feeding mechanism and the seam being internally supported by a head, comprising a chill bar and desirably water cooled, which is yieldingly mounted on a mandrel disposed in the interior of the blank and connected with the spreader roller mandrel which, in turn, is anchored to the downwardly depending fin to which reference has been made.

To increase rapidity of production the welding of the seam is preferably performed at two consecutive stations, the second station being disposed slightly in advance of the first and operating to complete the previously partially welded seam. However, if desired, the welding may all be done at the first station or at more than two stations, although two are usually found to be most satisfactory, and as the blank passes from the last station it encounters a scraping or dressing mechanism which serves to remove any splatters or globules of the welding metal from the vicinity of the welded seam and, in certain instances, to dress down the latter itself in case the burr is excessive, thus placing the seam and the surface of the blank in the vicinity thereof in proper and clean condition. As it leaves the scraping mechanism, the blank then encounters an annealing device which preferably comprises an electrode so positioned as to maintain an arc between itself and the blank suitable to anneal the seam and ordinarily a small portion of the blank on each side thereof to thereby render the seam soft and ductile, the blank as it leaves the annealing arc passing almost immediately between juxtaposed internal and external rollers which roll the seam and to some extent work the metal thereof so as to improve its general characteristics, the internal roller being carried by a mandrel disposed in the interior of the blank and interconnected with the welding head mandrel to which reference has been made.

The weld is now completed and the blank in condition for removal from the machine, but in the preferred embodiment of the invention I prefer to provide at this point a grinding wheel and suitable driving mechanism therefor which may be utilized to grind the seam into coincidence with the adjacent surface of the blank so as to remove any ridge which would serve to interrupt its cylindrical contour, this grinding operation being performed either for the whole length of the seam or for only a short distance at each end of the blank so as to facilitate the threading thereof in subsequent operations. As under ordinary conditions the presence of the ridge formed by the seam is objectionable only where the pipe is to be threaded, it is usually sufficient to merely grind the pipe at each end for a short distance, thus saving the power which would be necessary and the wear on the grinding wheel which would occur were the seam ground away for its entire length.

It will thus be observed that the various elements of the machine are so coordinated and arranged that as the blank is moved longitudinally past the various stations, it is prevented from axial rotation at all times; that the seam after having been properly prepared for welding is maintained in proper alignment with the welding electrode; that preparatory to the welding operation the seam is properly closed together and the blank rigidly positioned and held so that any deviation from the desired external and internal diameter of the finished pipe is avoided; that after the welding metal has been deposited the seam and surface of the blank in the vicinity thereof are cleaned and the seam thereafter annealed while in a condition to facilitate these operations, and finally, that the seam is worked while still in a more or less plastic state so as to improve its general characteristics and quality. Moreover, as will hereinafter appear, the various elements of the machine are so constructed as to facilitate their adjustment for operation with blanks of different diameters, while by reason of the general design and arrangement of the machine, the rapidity with which the various operations can be successfully performed is enhanced with resulting increase in the speed with which the finished pipe can be produced.

I shall now advert with more particularity to the details of construction and arrangement of the various means and instrumentalities to which reference has heretofore been made:

Conveyor mechanism

The conveyor mechanism which extends longitudinally beneath the path of the blank comprises a driving sprocket 1 and a driven sprocket 2, the latter being journaled in suitable pillow blocks 3 at a considerable distance in advance of the left hand end of the machine at which the blank is introduced, while the former is carried on a shaft supported in vertically adjustable brackets 4, 4 mounted on the right hand end of the machine housing. Beneath these brackets in a depression in the floor of the building is disposed elevating mechanism, generally designated as 5, comprising a plurality of screw jacks by means of which the brackets carrying the sprocket shaft may be raised and lowered as and when desired, the bolts by which the brackets are secured to the housing extending through slots in the brackets as best shown in Fig. 15 so as to permit this adjustment. The driving sprocket 1 may be actuated in any convenient way as by a pair of silent chains 6 extending over other sprockets 7, 7 on the sprocket shaft and to sprocket pinions 8 on the shaft of a gear reduction mechanism or mechanisms generally designated as 9 and interconnected with the driving motor (not shown) by the driving shaft 10. Since vertical adjustment of the brackets 4 will necessarily change the tension on the silent chains 6, the gear reduction mechanisms and motor are preferably mounted on a longitudinally adjustable base 11 so they can be moved as a unit toward or away from the driving sprocket to compensate for this variation.

The driving and driven sprockets 1 and 2 are connected by a chain 12 of any suitable form, that shown comprising spaced rollers 13 which are effective to carry the weight of the chain in its guide as hereinafter described. At suitable intervals the chain is provided with dogs 14 which are adapted to engage the rear end of the blanks as the latter are positioned adjacent the upper run of the chain and thereafter carry the blank through the machine. To enable the dogs to suitably pick up the blanks, the sprocket wheel 2 is therefore positioned at a considerable distance from the entering end of the machine proper, the exact position of the sprocket depending largely on the length of the blanks which are to be employed.

In their passage through the machine the blanks are supported on laterally spaced rollers 15 which are mounted for rotation on horizontal axes and longitudinally spaced at suitable intervals. These rollers 15, as best shown in Figs. 2 and 4, are carried by a channel guide 16 which also forms a supporting track for the upper run of the conveyor chain which travels between the rollers, the bottom of the channel being cut away adjacent each roller so as to allow the latter to project downwardly therethrough. This channel is in turn supported at longitudinally spaced intervals on pairs of transversely spaced supporting rods 17, the upper ends of each pair of which are secured to the channel guide in any suitable way, conveniently by providing the rods with threaded extensions of reduced diameter of sufficient length to project through holes drilled in the bottom of the guide for the reception of nuts which are then screwed down against the upper face thereof, the guide thus seating on the shoulders formed below the upper ends of the rods, as best shown in Fig. 5.

The lower ends of each pair of rods are also reduced in diameter and extended through and secured in a cross head 18 at the upper end of a threaded shaft 19 carrying a nut 20 which is housed and prevented from vertical movement in a U-shaped bracket 21 disposed in a pit extending longitudinally beneath the machine. The nut 20 has a worm gear 22 on its exterior which is adapted to mesh with a worm 23 on a horizontal, longitudinally extending shaft 24 which may be driven in either direction through the medium of a sprocket and chain generally designated as 25 extending to a driving motor 26 mounted at any convenient point, the arrangement of these several parts, save the motor and driving chain, being best shown in Fig. 14.

It will thus be apparent that rotation of the shaft 24 is effective to turn all of the nuts 20 in unison, and since the supporting rods and their interconnected elevating mechanism as just described are disposed at intervals longitudinally of the machine and the several U-shaped brackets 21 connected either to the base thereof or to supporting frames 27 extending across the pit where necessary as, for example, at points at which it is desirable to provide a support for the channel guide but the machine presents no convenient point for attachment of the subjacent U-bracket, operation of the motor 26 is thus effective to raise or lower the channel guide within the limits permitted by the length of the shafts 19, thus correspondingly raising or lowering the supporting rollers 15 carried by the guide.

In order to provide a support for the lower run of the conveyor chain, angle irons 28 are bolted to the inner faces of each pair of the supporting rods with their respective flanges oppositely inwardly turned so as to engage and support small rollers 29 carried by supports 30 mounted on the chain at suitable intervals.

As the driven sprocket 2 is ordinarily positioned a considerable distance beyond the adjacent end of the channel guide, it is usually unnecessary to provide any means for vertically adjusting it as there is sufficient slack in the chain beyond the guide to compensate for the raising or lowering of the latter and other parts of the conveyor mechanism which move therewith within the limits of their permitted vertical adjustment.

*Seam preparing mechanism*

This mechanism which is positioned adjacent that end of the machine at which the blank is introduced and which is shown in the drawings as the left hand end, comprises a housing generally designated as 35 and which includes a base extending across the pit to which reference has been made and securely bolted to the floor or other supporting surface and an upper portion which, as best shown in Fig. 2, generally conforms to a hollow cylindrical sleeve of sufficient internal diameter to receive the largest blank B with which the machine is intended to be used. The channel guide 16 extends through the lower part of the opening in this housing, which may be cut away somewhat to receive it, while midway between its ends the housing is again cut away transversely and provided with vertically extending guides 36 having ways in their opposed inner faces in which a milling head 37 is slidably disposed and arranged for vertical adjustment through the medium of racks and pinions 38 actuated by a hand wheel 39. To facilitate the adjustment of the head, the latter is desirably counterbalanced through the medium of a pair of counterweights 40 each connected with the head by a cable 41 extending over suitably positioned sheaves 42 located adjacent opposite ends of the head.

The head is adapted to carry a plurality of longitudinally spaced milling cutters 43 as well as a plurality of positioning rollers 44 disposed alternately with the cutters and adapted to enter the seam in the blank as it passes beneath them so as to insure its proper relation to the cutters as they act upon it. These cutters are driven through suitable gearing or other mechanism located in the head from a spline shaft 45 extending vertically up from the head and upon which is disposed a bevel gear 46 rotatable in a bracket 47 mounted on the housing and thus adapted to turn the spline shaft when it is itself rotated through the medium of another bevel gear 48 on a shaft 49 journaled in the bracket and driven through the medium of a sprocket chain 50 from a motor 51 mounted on the housing in such manner that, irrespective of the vertically adjusted position of the head 37, the drive of the milling cutters 43 can always be effected, these cutters of course being mounted on shafts extending parallel to the horizontal diameter of the blank.

At its entering end the housing is provided with a central depending fin or web 54 in which, if desired, may be disposed vertically extending rollers 55 of relatively small diameter; this web is adapted to extend downwardly through the seam of the blank so as to terminate somewhat below its horizontal diameter and is operative, among other things, to support at its front end, that is, the end toward which the blank moves, a laterally extending bracket in which are journaled a pair of spreading rollers 56 adapted to engage the inner wall of the blank substantially at the ends of its horizontal diameter so as to spread the blank as it moves into the housing. The web also serves at its opposite end as an anchor for the adjacent end of the spreading roller mandrel 60 hereinafter more fully described and which is connected thereto by means of a link 57. Mounted on the housing in advance of the spreading rollers 56 is a positioning roller 58 which is journaled on a horizontal axis and supported in a bracket 59 adapted for vertical adjustment on the housing so that the roller can be so disposed as to enter the seam of the advancing blank prior to its passage into the housing. A similar roller 58' on a bracket 59' is arranged at the opposite end of the housing for a similar purpose, that is, to enter the seam of the blank as it leaves the housing and thereby restrain the same against any possible axial rotation.

*Spreading rollers and mandrel*

While the blank is passing through the mechanism just described and being operated on by the milling cutters 43, it is securely maintained at the proper internal diameter by suitably disposed spreading and positioning rollers mounted on the buggy 60 to which reference has been made and which is disposed in the interior of the blank and anchored at its rear end through the medium of the link 57 to the fin 54. At the same time, the blank is firmly positioned exteriorly and prevented from expansion under the action of the milling cutters by positioning rollers carried by the housing, these rollers being preferably disposed to respectively act radially inward on the blank in the four quadrants formed between its vertical and horizontal diameters, as best shown in Fig. 2. The uppermost sets of these rollers are designated as 61 and are carried in adjustable brackets 62 mounted on longitudinally extending inclined shelves 63 disposed on the housing in transverse alignment with the head 37; in generally like manner, the lower sets of these rollers, designated as 64, are journaled in brackets 65 preferably removably positioned in longitudinally extending supports 66 integral with the housing. Provision for adjusting these lower rollers radially may be provided or, as shown, the supporting brackets and rollers may be made removable so that brackets of different lengths can be readily substituted so as to properly locate the rollers as required for different diameters of blanks. The rollers 61 and 64 are thus effective to limit the outward radial expansion of the blank and preserve the proper contour thereof against the thrust of the milling cutters which act consecutively on the blank as it passes beneath them.

The mandrel 60 as best shown in Figs. 2 and 8 comprises a body 70 having downwardly and outwardly flaring jaws 70' in which are mounted supporting rollers 71 which serve to support the mandrel on the inner surface of the blank and upwardly extending brackets 72 respectively carrying rollers 73 adapted to enter the seam of the blank from below in cooperation with the rollers 44 with which the rollers 72 are desirably respectively aligned. The mandrel body is also provided on each side with laterally projecting longitudinally spaced brackets 74 provided with spreading rollers 75 disposed on the horizontal diameter of the blank and operative to spread the same slightly to or at least maintain it at the proper finished internal diameter while the dressing up of the seam is in progress. At its rear end the mandrel is connected by the link 57 to the web 54 and from its opposite or forward end a connecting link 76, desirably in the form of a hollow tube or pipe, extends to and is connected with the welding head mandrel hereinafter described and which is located in the blank adjacent the point where the welding operation is performed.

It will thus be apparent that throughout the dressing up of the seam as the blank passes beneath the milling cutters 43, the blank, through the action of the several rollers to which reference has been made, is positively maintained at the proper finished diameter and is prevented from any axial movement through the action of the positioning rollers 58, 58'.

Welding mechanism

The welding mechanism proper as well as the mechanism employed for closing the seam in the blank just before it is welded is carried by a housing 80 best shown in Figs. 1b, 3, 4, and 5, which is arranged in longitudinally spaced relation with the seam preparing mechanism heretofore described. As in the case of the housing 35, the housing 80 comprises a base secured to the floor or other support and a hollow cylindrical portion through which the blank passes as it is carried along by the conveyor chain. Adjacent the rear end of this housing a positioning roller 58'' carried by a bracket 59'' is disposed, this roller being adapted to enter the seam of the blank so as to negative any possible axial rotation thereof as it passes into the housing 80.

This housing is operative to support one or more pairs of rolls each of which is adapted to contact the exterior of the blank at opposite ends of its horizontal diameter and for a suitable distance above and below that point, the rolls for this purpose being formed with suitably curved surfaces. Ordinarily two pair of these rolls are employed as shown in Fig. 1b, the first pair encountered by the blank in this movement being designated as 81 and the second pair as 82. Each of these rolls is desirably so mounted in the housing as to facilitate convenient removal and replacement with rolls of other diameters in conformity with the particular size of the blank which is being welded, and to this end the shafts 83 on which the rolls are mounted may be made axially removable as shown so that by pulling out any shaft the adjacent roll can be then taken out and after another roll is substituted therefor, the shaft replaced in position. Between the two pairs of side rolls is positioned another roll 84 rotatable on a removable shaft 85 and adapted to bear on the upper surface of the blank in the same way that the side rolls bear on the opposite sides thereof. Like the latter, the roll 84 is suitably curved in conformity with the blank and can be readily removed and replaced by taking out the shaft 85; it is desirably provided with a bead 86 at its center adapted to enter the seam of the blank and thus form a guide therefor and negative axial rotation of the blank at this point. These several rolls are operative to effect a seam closing pressure on the blank as it passes between them and thence to the crushing rolls 87—87 which are positioned just ahead of the first welding station. These crushing rolls are provided with curved surfaces and are respectively arranged to bear on the blank on opposite sides of the seam to exert inward pressure on the blank in a generally radial direction so as to bring the edges of the seam into engagement and retain them in such position just prior to the introduction of the welding metal to the seam. Thus, the crushing rolls are respectively arranged to bear on the blank in the upper quadrants formed between its vertical and horizontal diameters, the axis of each roll being upwardly and inwardly inclined at an angle of approximatey 45°. To enable these rolls to be simultaneously adjusted toward or away from the blank in correspondence with its diameter or to increase the pressure which they exert upon it, each roll, as best shown in Fig. 5, is journaled in a U-shaped frame 88 which is slidable in a guide 89 disposed on the housing. The guide is bored and threaded for the reception of an adjusting screw 90 secured to the frame and carrying on its outer extremity a bevel gear 91 cooperative with another gear 92 on a shaft 93 extending angularly inward toward the center line of the machine as best shown in Fig. 7. At the inner end of each of the shafts 93 is disposed another bevel gear 94, and these two gears are arranged in meshing engagement with a bevel gear 95 on a horizontal shaft extending longitudinally of the machine and journaled in a suitable bracket 96 supported on the housing. This shaft also carries another bevel gear 97 with which meshes a pinion 98 on a shaft 99 extending angularly outward to any convenient point and journaled in the bracket 96 and another bracket 100 carried by the housing; at the outer end of this shaft a hand wheel 101 affords a convenient means for effecting its rotation. Thus, by rotating the hand wheel both shafts 93 can be revolved simultaneously in the same direction, whereby the screws 90 are also similarly rotated, and as both of these screws have a corresponding and similar pitch the U-shaped frames carrying the rolls 87 will be moved outwardly or inwardly in unison, depending on the direction of rotation of the hand wheel 101 so as to correspondingly move the rolls toward or away from the blank.

As the seam is finally closed through the operation of the crushing rolls just described, the blank passes to the welding station or stations, two of the latter being preferably employed, although even a greater number may be utilized if desired. As hitherto stated, the welding is preferably performed through the medium of the well known metallic arc, although the carbon arc may be utilized under some conditions if preferred or, in fact, any other arc or method suitable for the purpose. Thus when using the metallic arc, a welding electrode E is disposed adjacent the rolls 87 and arranged to be fed downwardly toward the seam by any suitable mechanism such as a feed motor generally designated as 105 preferably mounted on an arm 106 suitably horizontally supported above the blank, the specific means employed for effecting the proper feed and regulation of the electrode forming no part of the present invention. Desirably, as stated, a second electrode E' and feed motor 105' are arranged somewhat in advance of the electrode E so as to complete the weld initiated by the latter; if desired, a third electrode might be arranged in advance of E' or, in fact, a plurality of electrodes, each operating to deposit a substantially predetermined amount of welding metal in the seam until the weld is entirely completed. Under most conditions of operation, however, two welding electrodes will be found amply sufficient to form a satisfactory seam with the desired degree of rapidity.

Means are provided for supporting the wall of the blank immediately beneath the welding station and also for exerting vertical pressure on the seam just before it passes to the electrode, and for this purpose a welding head mandrel 110 is disposed in the blank in the vicinity of the welding point. This mandrel comprises a body the rear end of which is connected by the tubular connecting member or link 76 with the adjacent end of the spreading roller mandrel hitherto described, and is operative to support longitudinally spaced pairs of wheels 111 which seat on the inner surface of the bottom part of the blank as best shown in Fig. 5. A bracket 112 mounted on the body serves as a support for a pressure roller 113 rotatable on a horizontal axis, the mountings of the roller shaft being vertically slidable in the bracket and springs 114 being arranged to continuously yet yieldingly urge the roller upwardly against the blank in the vicinity of the seam. Just above this roller another roller 115 is arranged to bear on the exterior of the blank and, in cooperation with the subjacent roller, level the juxtaposed edges of the seam; this roller is desirably provided with a central bead (Fig. 5) adapted to enter the latter and is made vertically adjustable so that the pressure it exerts on the blank may be controlled as desired. To this end the roller shaft is mounted in a head 116 vertically slidable in ways carried by the housing and connected with an upwardly extending screw 117 cooperating with a nut 118 suitably restrained from vertical movement and having a worm gear on its exterior cooperative with a worm on a horizontally extending shaft 119 running transversely of the machine and supported in the brackets 96, 97 or in any other convenient way, a hand wheel 120 at the outer end of this shaft affording a convenient means for effecting its rotation; thus, by turning the hand wheel 120 in one direction or the other the roller 115 can be raised or lowered in correspondence with the diameter of the blank or to vary the pressure it exerts thereon.

The mandrel 110 is also operative to carry a chill member 125 which is preferably in the form of a hollow casting and is supported on posts 126 slidably extending through suitably arranged holes in the mandrel, springs 127 surrounding the posts and interposed between the mandrel and the member operating to yieldingly urge the latter upwardly toward the blank as best shown in Fig. 9; adjusting nuts 128 threaded onto the lower ends of the posts serving to limit the extent which the member can be moved upwardly.

As stated, the chill member is preferably made hollow and a circulation of water or other cooling fluid maintained therein through the medium of pipes 130, 131 which extend to and from the member and then enter the tubular connecting link 76 and are carried therethrough to emerge therefrom adjacent its rear end, from whence they are carried adjacent the mandrel 60 and thence upwardly and outwardly through the fin 54, the diameter of these pipes being, of course, sufficiently small to enable them to pass through the seam of the blank in the vicinity of the fin. The connections by which the fluid is carried to and conveyed from the pipes after they leave the fin are not shown in Fig. 1a and may be of any suitable form. At the upper surface of the chill member is disposed a chill bar in the form of a suitably shaped plate 132 of very hard and heat resistant material of such character as to be substantially unaffected by the intense heat to which it is necessarily subjected when in contact with the blank just below the welding point; preferably, the under face of this plate is cored out for the reception of an electric coil (not shown) which is operative by suitable regulation of the current flowing therethrough from suitable conductors extending in the interior of the blank and out of the seam thereof adjacent the fin 54 to control the welding arc and centralize the heating effect thereof. The specific details of construction of this coil and its method of operation form no part of the present invention.

Cleaning mechanism

During the welding operation a certain amount of the welding metal is apt to splash out on the blank and adhere thereto in more or less globular form, and for the purpose of removing this excess metal and, if desired, for likewise removing a portion of the ridge or burr formed by the welded seam itself, a scraper 135 having a more or less U-shaped cutting edge is disposed somewhat in advance of the last electrode in a position to operate on the blank as it passes beneath it. This scraper is disposed in a vertically adjustable head 136 carried in ways 137 on a bracket 138 secured to a housing 139 adjacent the right hand end of the machine and which, like the other housings to which reference has been made, is of generally hollow cylindrical contour and provided with a base seating on the floor or other supporting medium; this housing is preferably tied to the housing 80 by webs 140 disposed on each side of the conveyor mechanism and which are effective to increase the rigidity of the entire structure. Preferably, as shown in Fig. 11, the scraper 135 is pivoted and yieldingly supported in such a way that should it encounter an excessively large accumulation of metal on the blank, it will swing out of the way before it is subjected to a pressure great enough to bend or break it.

The seam is now subjected to an annealing operation which serves to soften the metal of the seam and render it of suitably ductile character. This annealing is desirably accomplished by an annealing electrode AE mounted on the housing 139 in vertical position and arranged for vertical adjustment to or from the blank through the medium of a hand wheel 141 or in any other convenient way. The particular means employed for mounting and controlling the annealing electrode are capable of considerable variation and thus may be of any preferred character as long as they are operable to suitably position the electrode in such relation to the seam as to maintain an arc between it and the seam metal suitable for raising the latter to an annealing temperature.

As the blank passes from the annealing electrode and thus while the seam is still but little below the annealing temperature, it is almost immediately subjected to pressure between a pair of rollers 142, 143 which serve to compress and work the seam metal to thereby compact it and increase its homogeneity. The uppermost of these rollers which bears on the exterior of the seam is mounted on a horizontal shaft carried in a vertically slidable head 144 controlled through the medium of an adjusting screw 145 cooperative with a nut 146 actuated through a shaft and hand wheel 147, so that by rotation of the wheel the position of the roller 142 and pressure exerted thereby may be varied. The lower roller 143 is carried in a mandrel 150 which is attached by a connecting member or link 151 to the adjacent end of the welding head mandrel 110. The mandrel 150 is supported in the interior of the pipe, similarly to the welding head mandrel, on wheels 152, and the roller 143, as best shown in Fig. 13, is slidably mounted in the mandrel and yieldingly pressed upwardly against the blank by suitably disposed springs 153 so as to exert a yielding pressure on the blank beneath the roller 142.

As the blank leaves the rollers 142, 143, the several operations incident to the preparation and welding of the seam and the subsequent cleaning of the blank, annealing and working of the welded seam have been completed, and the blank may therefore be ejected onto a suitable conveyor or the like for transportation to some other point for subsequent operations forming no part of the present invention. However, in order to grind the ridge formed by the welding metal into coincidence with the adjacent surface of the blank either merely at the ends thereof or throughout its length, whichever may be desired, I preferably mount a grinding wheel 155 in a vertically adjustable bracket 156 secured to the housing in advance of the rollers 142, 143 and arrange to drive the wheel from a motor 157 through driving chains or belts 158 or in any other suitable way, so that as the blank leaves the housing the wheel will operate to grind off the ridge. As shown, the grinding wheel bracket is arranged to be secured to the housing in any desired position of vertical adjustment, and thus, after the bracket is once adjusted, the wheel will operate on the seam ridge throughout its length; where it is desired to merely grind off the ridge for a short distance from each end of the blank to facilitate subsequent threading operations, the bracket may be so arranged that the wheel can be swung out of engagement with the blank, either manually or otherwise, save only when the ends of the blank are passing beneath it.

For the sake of clearness, the wiring and control mechanisms for the various motors, including those employed for feeding the electrodes, have been omitted from the drawings, but under most conditions the said mechanism will be assembled at a central station convenient to the hand wheels 101 and 120 at which it, as well as the said wheels, may be readily manipulated by the operator of the machine.

As it is believed that the operation of the machine will be readily understood from the foregoing description, detailed reference thereto would be superfluous.

It will thus be apparent that in accordance with my invention I have provided a novel method of welding the longitudinal seams of pipe blanks and other tubular articles in the course of which the blank is constrained to move through a predetermined path and maintained therein with the nicety requisite for satisfactory operation; that during the movements of the blank along this path the seam is first prepared for welding, is then closed to a condition suitable for welding, is then welded, then cleaned, and finally annealed and worked before it has appreciably lost its annealing temperature, with the result that a satisfactory, ductile and homogeneous weld is produced in a minimum of time, and further, that I have provided a novel form of machine suitable for the performance of the several sequential and inter-related operations incident to the performance of the said method. It will further be noted from the foregoing description that all of the various parts of the machine which require adjustment in order to accommodate the latter to blanks of various diameters are so arranged as to facilitate that adjustment when and as required, while all of the various elements are of such character as to negative the liability of their becoming damaged and getting out of order under the conditions of use to which machines of the general character of that herein involved are necessarily subjected. Moreover, while the details of construction and arrangement of the various parts of the machine are capable of material modification from those embodiments thereof which I have herein illustrated and described, the latter are eminently satisfactory for the performance of the various intended functions and will thus generally be preferred.

Having thus described my invention, I claim and desire to protect by Letters Patent of the United States:

1. In a welding machine comprising means adapted to progressively weld the longitudinal seam of a tubular blank, means for raising the welded seam to an annealing temperature and means for thereafter working the heated metal of the seam comprising a pressure roller disposed outside the blank, a pressure roller disposed inside the blank, and means for yieldingly pressing the inner roller against the wall of the blank oppositely to the pressure exerted thereon by the outer roller.

2. In a welding machine comprising means adapted to progressively weld the longitudinal seam of a tubular blank, electrically operated means for raising the welded seam to an annealing temperature and means for thereafter working the heated metal of the seam comprising a roller adapted to engage the outer surface thereof and means for vertically adjusting said roller, a roller disposed in the blank adapted to engage the inner wall thereof beneath the first roller, a wheeled mandrel disposed in the blank operative to support the inner roller, and yielding means carried by the mandrel adapted to press said roller into engagement with the blank.

3. In a welding machine comprising welding means adapted to weld a longitudinal seam in a tubular blank, means for subjecting the welded seam to an annealing temperature, means for thereafter working the annealed seam comprising opposed rollers operative to engage the outer and inner surfaces of the seam and means for maintaining said rollers in substantial radial alignment relatively to the blank.

4. In a welding machine comprising means for progressively welding a longitudinal seam of a tubular blank, means including an adjustable electrode for progressively subjecting the welded seam to an annealing temperature, means comprising a pair of opposed rolls respectively disposed within and without the blank for progressively working the annealed seam before it has appreciably lost its annealing temperature, and means for yieldingly pressing the inner roll against the blank.

5. In a progressive electric welding machine the combination of means for welding a longitudinal seam in a tubular blank, means for subjecting the welded seam to an annealing temperature and means for immediately thereafter working the annealed seam, said last named means comprising opposed rollers operative to engage the outer and inner surfaces of the annealed seam.

6. The method of producing electrically welded pipe from open seam tubular skelp which comprises the steps of progressively welding the open seam surfaces together by the application of electric current and pressure thereacross, heating only the material of the seam to a temperature approximating the critical range by passing an electric current through said material and immediately thereafter applying working pressure to opposite surfaces of the annealed metal to reduce the grain structure of the annealed metal.

CARL CARLSEN.